(12) United States Patent
Van Camp et al.

(10) Patent No.: US 9,320,284 B2
(45) Date of Patent: Apr. 26, 2016

(54) CONVEYOR OVEN WITH SPLIT FLOW SCROLL

(71) Applicant: The Middleby Corporation, Elgin, IL (US)

(72) Inventors: Richard H. Van Camp, Aurora, IL (US); William S. Schjerven, Sr., Schaumburg, IL (US); Theodore James Chmiola, Roscoe, IL (US)

(73) Assignee: THE MIDDLEBY CORPORATION, Elgin, IL (US)

( * ) Notice: Subject to any disclaimer, the term of this patent is extended or adjusted under 35 U.S.C. 154(b) by 423 days.

(21) Appl. No.: 13/831,134

(22) Filed: Mar. 14, 2013

(65) Prior Publication Data

US 2014/0261371 A1   Sep. 18, 2014

Related U.S. Application Data

(60) Provisional application No. 61/778,243, filed on Mar. 12, 2013.

(51) Int. Cl.
*A21B 1/24* (2006.01)
*A21B 1/26* (2006.01)
*A21B 1/48* (2006.01)

(52) U.S. Cl.
CPC . *A21B 1/245* (2013.01); *A21B 1/26* (2013.01); *A21B 1/48* (2013.01)

(58) Field of Classification Search
CPC .............. A21B 1/245; A21B 1/48; A21B 1/26
See application file for complete search history.

(56) References Cited

U.S. PATENT DOCUMENTS

| | | | |
|---|---|---|---|
| 2,330,938 A | 10/1943 | Williams | |
| 3,211,360 A | 10/1965 | Lyman et al. | |
| 3,950,112 A | 4/1976 | Crump et al. | |
| 4,944,654 A | 7/1990 | Chou et al. | |
| 6,131,559 A * | 10/2000 | Norris | A21B 1/245 126/21 A |
| 6,339,935 B1 | 1/2002 | Moretti et al. | |
| 6,481,433 B1 | 11/2002 | Schjerven, Sr. et al. | |
| 6,655,373 B1 | 12/2003 | Wiker | |
| 8,281,779 B2 | 10/2012 | Wiker et al. | |

* cited by examiner

*Primary Examiner* — Alfred Basichas
(74) *Attorney, Agent, or Firm* — Michael Best & Friedrich LLP

(57) ABSTRACT

A convection oven system. The convection oven system including a cooking chamber, a heat source for generating heated air to be provided to the cooking chamber, a centrifugal blower in airflow communication with the heat source, an air distribution housing in airflow communication with the centrifugal blower, the air distribution housing having a plurality of outlets, and at least one heat distribution finger in airflow communication with the plurality of outlets of the air distribution housing. The heated air generated by the heat source is forced by the centrifugal blower through the outlets of the air distribution housing into the at least one finger for distribution into the cooking chamber.

20 Claims, 8 Drawing Sheets

CONVEYOR OVEN WITH SPLIT FLOW SCROLL

CROSS-REFERENCE TO RELATED APPLICATIONS

This application claims priority to U.S. Provisional Patent Application No. 61/778,243, filed Mar. 12, 2013, which is incorporated herein by reference in its entirety.

BACKGROUND

The present invention relates to convection-heated conveyor ovens and airflow components for such ovens.

Convection-heated conveyor ovens, examples of which are shown in U.S. Pat. Nos. 5,277,105, 6,481,433, 6,655,373, and 8,087,407 (each of which is incorporated herein by reference), may be used to cook a variety of food products, such as bread or pizza, among other products. Food is cooked by blowing heated air onto the food product to be cooked from above and below a conveyor belt on which the food is carried. Larger or smaller blowers may be used depending on the size of the oven. While smaller blowers offer a finer degree of control and higher efficiency, they are less practical for larger ovens.

Conveyor ovens are typically large metallic housings with a heated tunnel extending through them and a conveyor running through the tunnel. Conveyor ovens may be constructed in any suitable size. The conveyor transports food products through the heated oven tunnel at a speed which bakes food products during their transit through the tunnel. Such conveyor ovens typically include a heat delivery system including blowers which supply heated air to the tunnel from a plenum which is heated by one or more gas burners or other heating elements. The blowers force the heated air through passageways leading to metal fingers that open into the oven tunnel at locations above and below the conveyor. The metal fingers act as airflow channels that deliver streams of hot air which impinge upon the surfaces of the food products passing through the tunnel on the conveyor. In modern conveyor ovens, a microprocessor-driven control panel generally enables the user to regulate the heat, the speed of the conveyor, etc., to properly bake the food product being transported through the oven. A food product, such as a raw pizza, may be placed on the conveyor at one end of an oven and removed from the conveyor as a fully baked pizza at the other end of the oven. The speed at which the conveyor moves is coordinated with the temperature in the heated tunnel so that the emerging fully cooked food is properly baked or cooked.

Heat delivery systems for conveyor oven systems typically include a heat source in the form of one or more gas-fired burners (or other heat source) for heating a plenum. For example, the burner can be located at the front or back of the oven for heating a plenum located at the back of the oven. Blowers are typically provided to move heated air in the plenum through passageways to metal fingers that open into the oven at appropriate spacings from the conveyor belt to deliver streams of hot air onto food products being transported on the conveyor. The heat source is cycled on and off as necessary by a controller responding to signals from temperature sensors (e.g., thermocouples) positioned, for example, at the inlet and outlet ends of the oven tunnel.

SUMMARY

In one embodiment, the invention provides a convection oven system. The convection oven system including a cooking chamber, a heat source for generating heated air to be provided to the cooking chamber, a centrifugal blower in airflow communication with the heat source, an air distribution housing in airflow communication with the centrifugal blower, the air distribution housing having a plurality of outlets, and at least one heat distribution finger in airflow communication with the plurality of outlets of the air distribution housing. The heated air generated by the heat source is forced by the centrifugal blower through the outlets of the air distribution housing into the at least one finger for distribution into the cooking chamber.

In another embodiment, the invention provides a convection-heated conveyor oven system. The convection-heated conveyor oven system includes a cooking chamber including a tunnel; a conveyor belt disposed within the tunnel; a heat source for generating heated air to be provided to the cooking chamber; a housing with an air splitter which directs air to a plurality of outlets in the housing; a centrifugal blower in airflow communication with the heat source and disposed within the housing; and a plurality of heat distribution fingers in airflow communication with the housing, wherein the heated air generated by the heat source is forced by the centrifugal blower through the plurality of outlets of the housing and into the plurality of fingers for distribution into the cooking chamber.

In yet another embodiment, the invention provides an air distribution housing for use in a convection oven, the convection oven including a cooking chamber, a heat source for generating heated air to be provided to the cooking chamber, a centrifugal blower in airflow communication with the heat source, and at least one heat distribution finger for directing heated air into the cooking chamber. The air distribution housing includes an air splitter for dividing a first stream of heated air into at least two second streams of heated air and at least two outlets to which the at least two second streams of heated air are directed.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
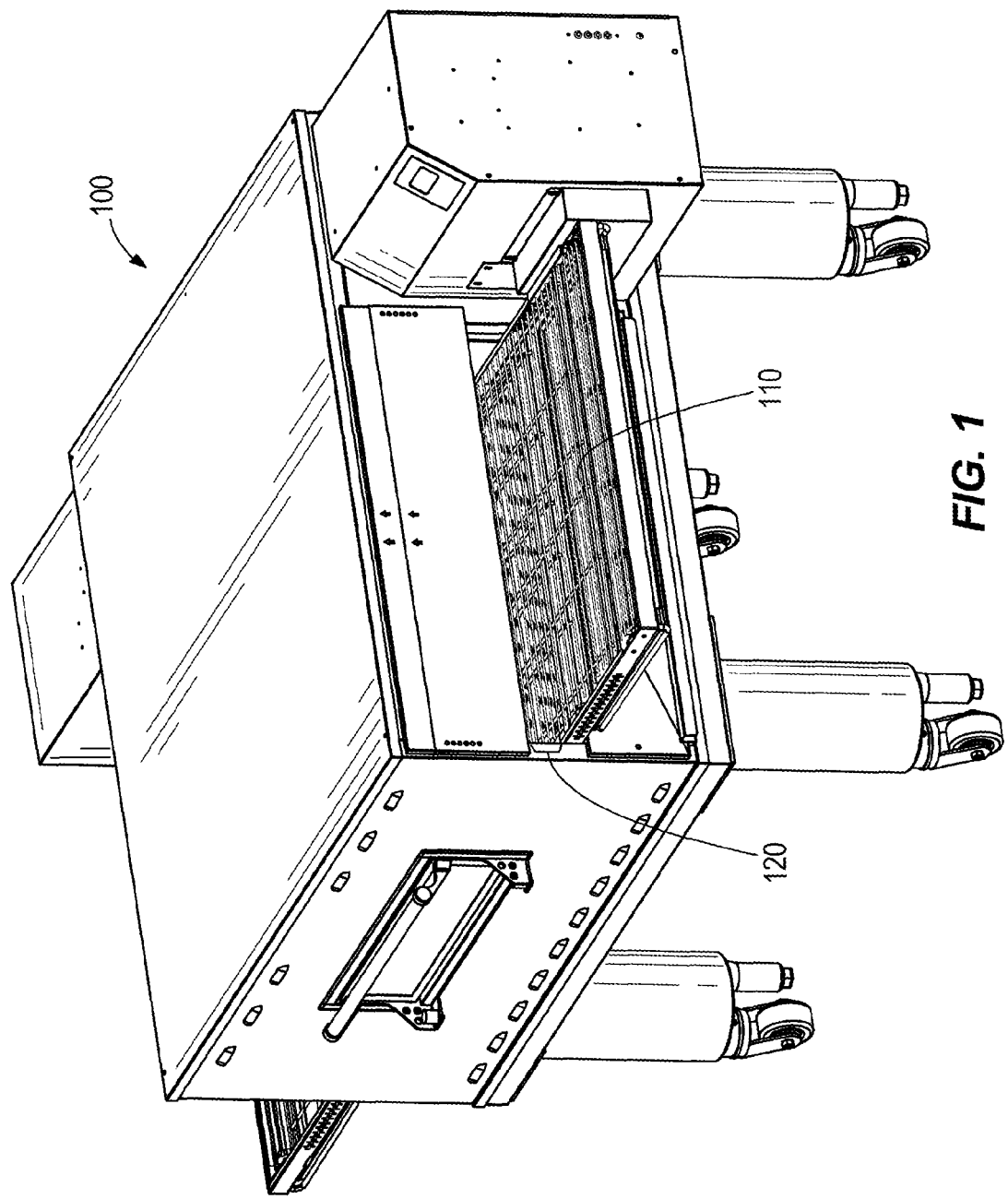
FIG. 1 shows a perspective view of a convection-heated conveyor oven.
Figure 2:
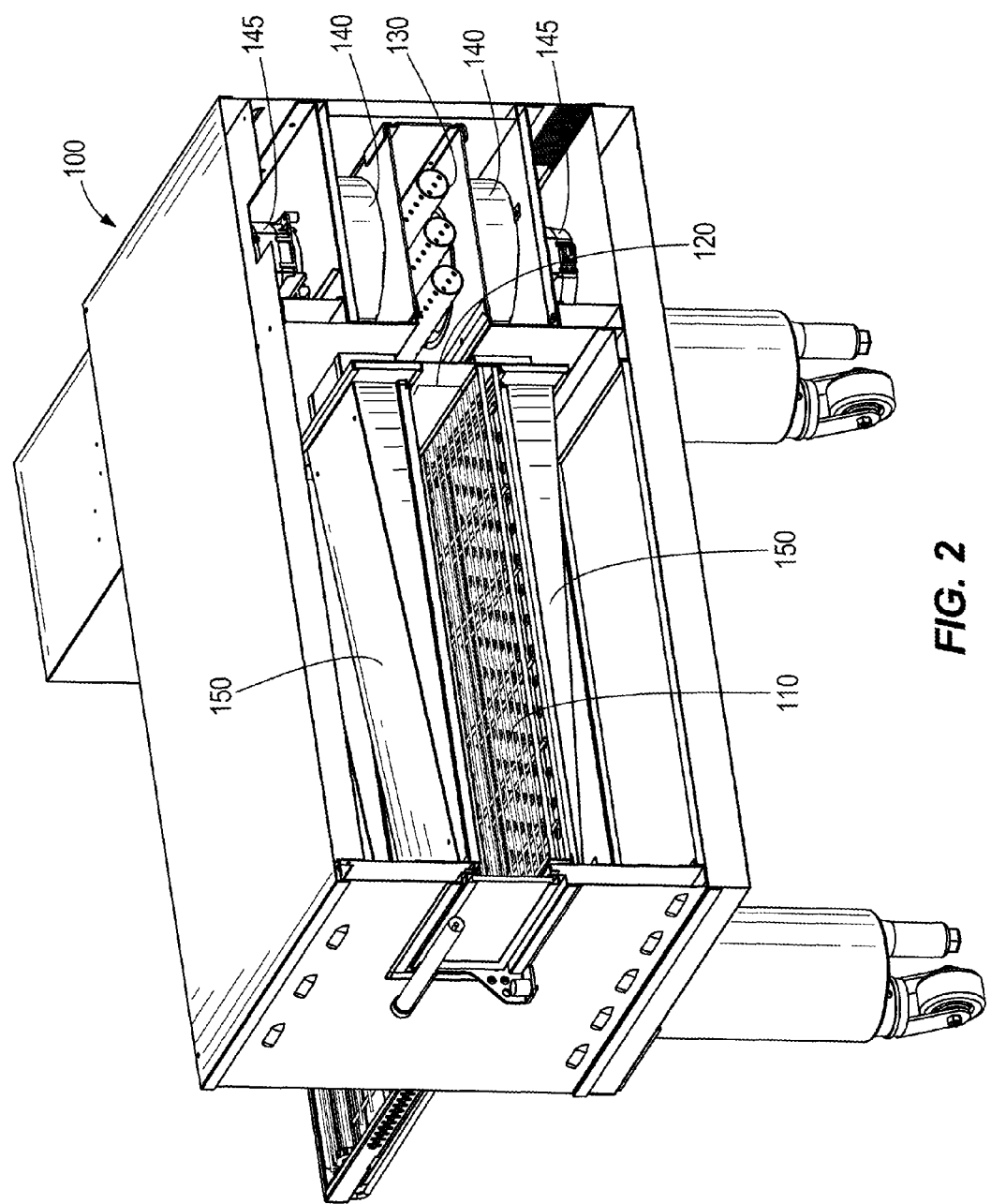
FIG. 2 shows a cross-sectional perspective view of a convection-heated conveyor oven.

The structure and operation of a typical convection-heated conveyor oven 100 is shown in FIGS. 1-4 and described below. FIG. 1 shows a convection-heated conveyor oven 100 having a conveyor belt 110 inside a heated tunnel 120; in certain drawings the conveyor belt 110 is omitted and the underlying conveyor mechanism on which the belt runs is shown instead. FIG. 2 shows a cross-sectional perspective view of the convection-heated conveyor oven 100 showing a heat source 130, split scroll housings 140 for centrifugal blowers 141, and heat distribution fingers 150 above and below the conveyor belt 110. Also seen in FIG. 2 is a pair of drivers 145 for the centrifugal blowers 141. In some embodiments the drivers 145 are electric motors which provide a direct drive to the centrifugal blowers 141 and in other embodiments the centrifugal blowers 141 may be belt-driven. A centrifugal blower 141 is a drum-shaped fan in which the outer portion of the drum contains a series of vanes; when the drum is rotated, air is drawn from the center of the drum outward through the vanes.

Figure 3A:
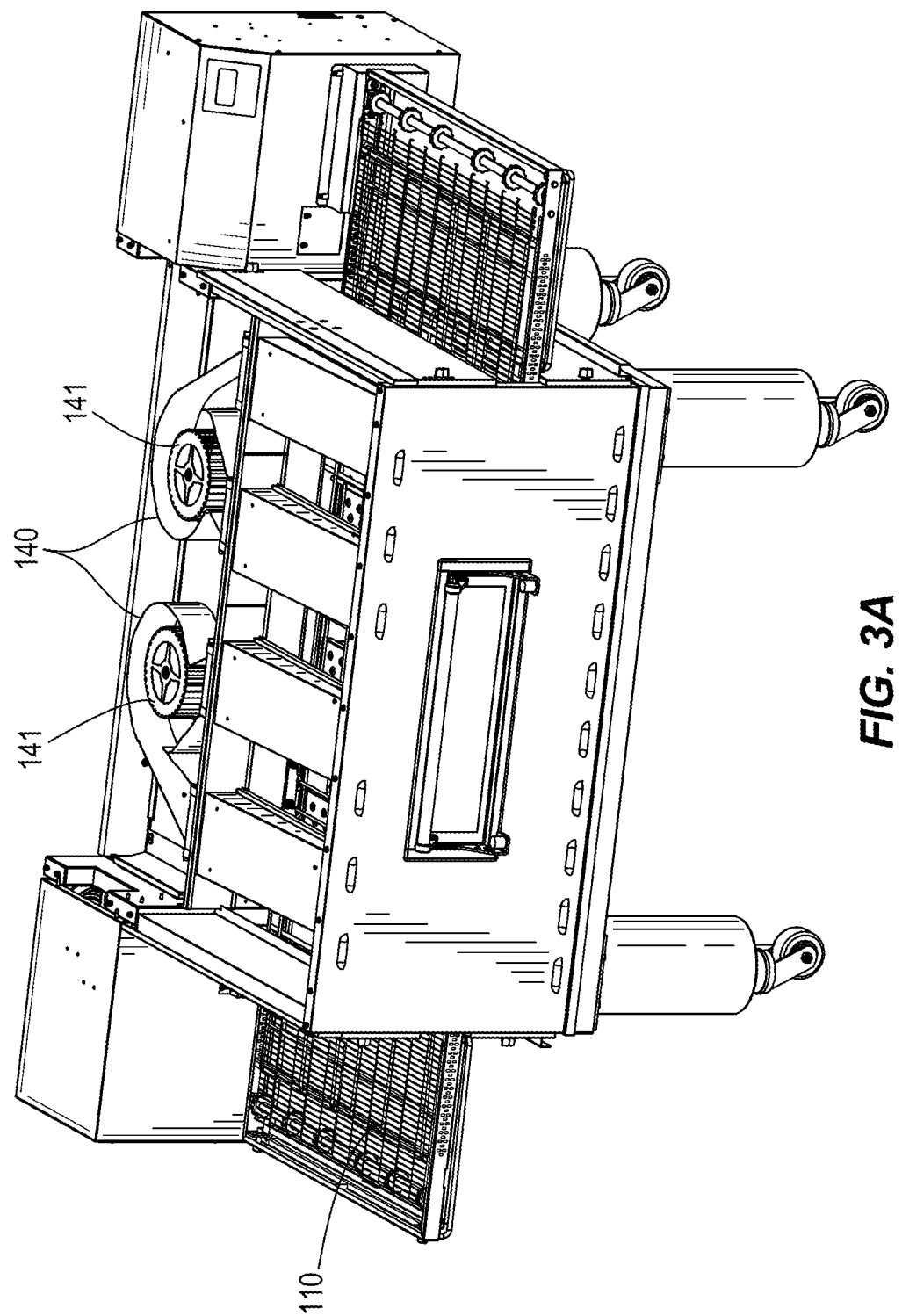
FIG. 3A shows another cross-sectional perspective view of a convection-heated conveyor oven.
Figure 3B:
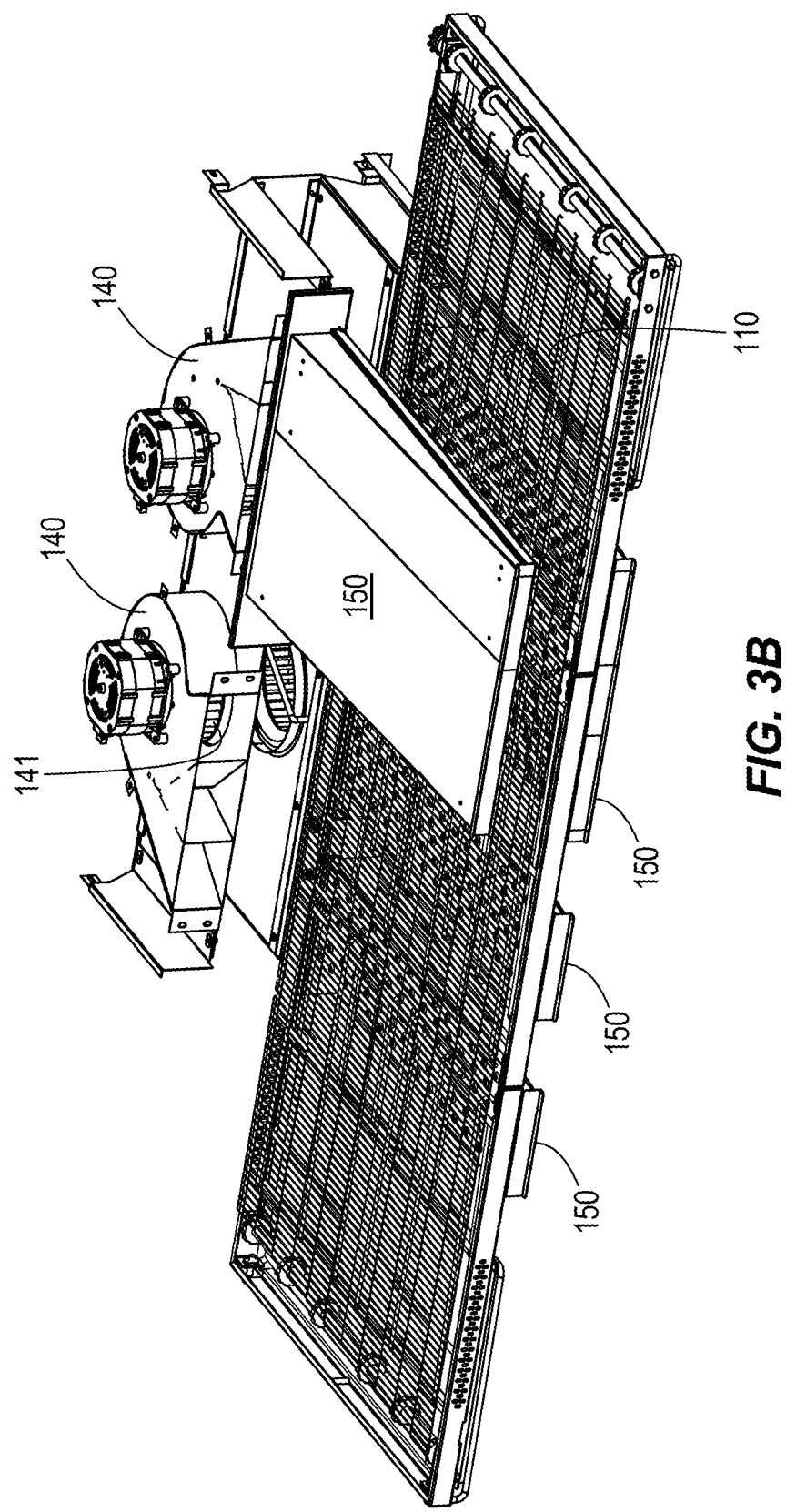
FIG. 3B shows a perspective view of a portion of the inside of a convection-heated conveyor oven showing both outlets of a split scroll housing feeding into a single large finger.
Figure 4:
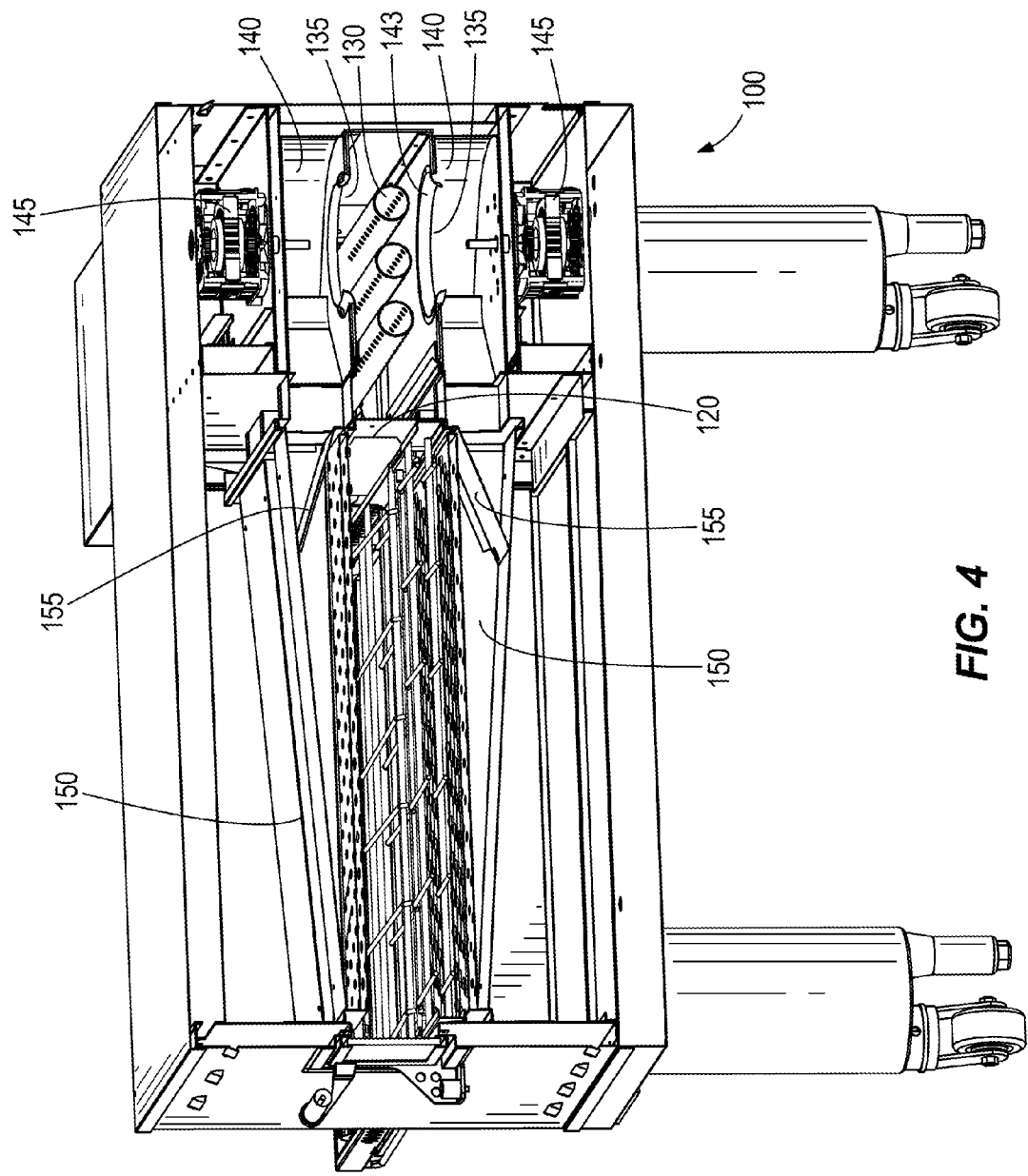
FIG. 4 shows yet another cross-sectional perspective view of a convection-heated conveyor oven.

FIG. 3A shows a cross-sectional perspective view of a convection-heated conveyor oven 100 showing two split scroll housings 140, each of which has a centrifugal blower 141 disposed therein, and each of which feeds into two heat distribution fingers 150 above the heated tunnel; the centrifugal blower has been omitted from some drawings. FIG. 3B shows a portion of the inside of a convection-heated conveyor oven showing both outlets of a split scroll housing 140 feeding into a single large finger 150. FIG. 4 is a cross-sectional perspective view of a convection-heated conveyor oven 100 showing the heat distribution fingers 150 above and below the heated tunnel 120. In some embodiments, perforated diffusers 155 are present in the fingers 150 to restrict and regulate flow of heated air into the fingers 150 (FIG. 4).

In operation, air is heated by the heat source 130 (e.g. by directing a gas flame inside the tubes that are part of the heat source 130) and heated air is drawn into the centrifugal blowers 141 through openings 135 above and below the heat source 130. Using conventional techniques such as those described in U.S. Pat. Nos. 5,277,105, 6,481,433, 6,655,373, and 8,087,407 one skilled in the art would understand that there are other ways to heat the air inside the plenum from which the blowers 141 draw heated air. Heated air is forced outward through the vanes of the centrifugal blowers 141 and is directed through the split scroll housing 140 and into the heat distribution fingers 150. From the heat distribution fingers 150 the heated air is directed into the heated tunnel 120 towards the conveyor 110, either from above or below, where it cooks the food items carried by the conveyor 110 through the tunnel 120 of oven 100.

As discussed above, convection-heated conveyor ovens cook foods by forcing heated air above and below the conveyor belt inside the heated tunnel. Within certain types of impingement conveyor ovens, including those described above, the fingers distribute heated recirculation air provided by centrifugal blowers. Currently, either relatively large blowers (e.g. a two-blower system on a common shaft, 1,600 CFM per wheel, belt-driven by a 2 HP motor, Table 1) are used which pressurize a common plenum which feeds all of the fingers or, alternatively, multiple relatively small, compact blowers (e.g. two individual wheels driven by a common motor, 250 CFM per wheel, belt-driven by a ⅜ HP motor, Table 2) are used which individually feed heated air directly into each of the fingers. Due to the inefficiencies of feeding multiple fingers from a single large plenum, a larger blower fan must be used to generate the necessary flow of heated air into the fingers and subsequently into the heated tunnel. On the other hand, using compact blowers that individually feed into the fingers provides a more efficient method for providing the air flow, as a result of more favorable fluid flow characteristics, and has the added benefit of producing an oven with quieter operation. Further, these compact blowers can provide independent control of air flow within various regions of the oven if configured with smaller, independent motors or drive systems.

TABLE 1 a typical 40" oven has the following specifications:

| | |
|---|---|
| Blower Motor: Mod. R912-400S | 1 @ 2 HP (BELT AND PULLEY DRIVE SYSTEM) |
| Belt width: | 32" |
| Cavity Length: | 40" |
| Baking Area: | 1,280 in.$^2$ |
| BTU/hr Max: | 99,000 |
| Blower Wheels: | 2 @ 9.14" DIA. × 5" WIDE |
| Theoretical Flow: | ~1,600 CFM per wheel @ 1725 RPM and 0.4" w.c. S.P. |

Wheel volumes per Revcor catalog (1M-8/99) testing wheels in blower housings per AMCA Bulletin 210, FIG. 4 test apparatus.

TABLE 2 a typical 36" oven has the following specifications:

| | |
|---|---|
| Blower Motor: Mod. Q575-250S | 2 @ ⅜ HP (BELT AND PULLEY DRIVE SYSTEM) |
| Belt width: | 24" |
| Cavity Length: | 36" |
| Baking Area: | 864 in.$^2$ |
| BTU/hr Max: | 75,000 |
| Blower Wheels: | 4 @ 5.25" DIA. × 2.5" WIDE |
| Theoretical Flow: | ~250 CFM per wheel @ 1725 RPM and 0.4" w.c. S.P. |

Wheel volumes per Revcor catalog (1M-5/00) testing wheels in blower housings per AMCA bulletin 210, FIG. 4 test apparatus The independently-controllable blowers can be part of a system that allows for a high degree of control within the oven. For example, the airflow rate of one or more blowers may be adjusted based at least in part upon one or more temperatures sensed within the oven, one or more positions of food within, entering, or exiting the oven, and/or the passage of one or more predetermined periods of time. To provide control over the airflow rate based upon any of these or other factors, the blowers may be driven by motors (which may be variable-speed motors) coupled to and controlled by a controller. To the extent variable speed motors are used, this permits a significant degree of control over airflow rate from the blower, where operation of the variable speed motors is performed by the controller.

Smaller, independently-controllable blowers can be used effectively for smaller ovens which may have, for example, two top fingers and two bottom fingers. For these ovens, two blower housings and their associated centrifugal blowers (which may be driven in tandem or independently) may be used for the top flow and two more to provide the bottom flow. This independent top-to-bottom flow allows easy adjustment of the air delivered to the product that goes through the heated tunnel. Thus, products that might require less heat energy to cook the top of the food item can be accommodated by reducing the airflow to the top fingers, thereby reducing heat transfer to the top section of the oven. Without this adjustability, physical changes to the blowers or the fingers would be required in order to accommodate products having different cooking requirements, for example to reduce the amount of airflow to one side of the conveyor. Control of the airflow can be accomplished through a variable frequency drive applied to each blower motor. The signal to the motors can be adjusted quickly and easily through a user interface. A selectable menu version of the control permits even more rapid changes to the blower speeds, temperatures, and belt speed times to accommodate differing products without the need to remember the various parameters.

Nevertheless, while smaller individual blowers can be effective for smaller ovens with relatively short and/or narrow conveyors (e.g. 24 or 36 inches), larger ovens (having longer and/or wider conveyors) have required relatively larger blowers, since the number of individual smaller blowers that are required to accommodate the additional fingers needed in a larger oven becomes undesirable. Consequently, a new method is needed to provide a smaller number of blowers (whether driven by pulleys and belts or by direct motor drive) to reduce the complexity and expense of the hardware and control mechanisms.

To achieve this, a blower housing having multiple outlets such as a split scroll housing 140 (see, e.g., FIG. 5) is provided. For example, the blower housing 140 shown in FIG. 5 has two outlets 146 to feed either a single large heat distribution finger 150 (FIG. 3B) or two or more smaller heat distribution fingers 150 (FIG. 3A). An air splitter 144 within the housing 140 provides the proper reduction in volume and directed air path to provide smooth, continuous flow to multiple outlets 146. In a preferred embodiment shown in FIGS. 5 and 6, the air splitter 144 divides the airflow into two separate paths which collectively have a smaller volume than an undivided outlet, thereby increasing the airflow rate and providing less turbulent airflow compared to the undivided outlet.

Using a split blower housing provides improved air/fluid flow characteristics compared to using a single large blower with an undivided plenum to feed multiple heat distribution fingers. The improved air/fluid flow characteristics are realized even when both outlets of the split housing are used to feed heated air to a single large finger. The improvement in airflow dynamics, which are realized at least in part from the use of the air splitter 144 and separate outlets 146, permit the use of a smaller blower to feed a given number of fingers, thereby saving space (i.e. oven footprint size), lowering cost (i.e. use of a smaller and less expensive blower), and reducing energy consumption (i.e. a smaller blower uses less power, delivers heated air more efficiently). In one embodiment of a 55" oven, a direct-driven blower which generates 725 CFM with a ⅓ HP motor is used in each of four air distribution housings 140 (Table 3), instead of using a single larger blower as discussed above. The use of a split scroll housing 140 provides for wider airflow coverage and distribution than single, standard involute scroll designs, thus permitting reduced hardware requirements than would be required for directly-connected blower arrangements. As a result, ovens using housings with multiple split outlets such as the split scroll blower housings require less hardware and reduced complexity in a more compact and quieter convection heat system.

TABLE 3 a typical 55" oven has the following specifications:

| | |
|---|---|
| Blower Motor: Mod. B743-250HS) | 4 @ 1/3 HP (DIRECT DRIVE SYSTEM) |
| Belt width: | 32" |
| Cavity Length: | 55" |
| Baking Area: | 1,760 in.$^2$ |
| BTU/hr Max: | 120,000 |
| Blower Wheels: | 4 @ 7.43" DIA. × 2.5" WIDE |
| Theoretical Flow: | ~725 CFM per wheel @ 1,725 RPM and 0.4" w.c. S.P. |

Figure 8:
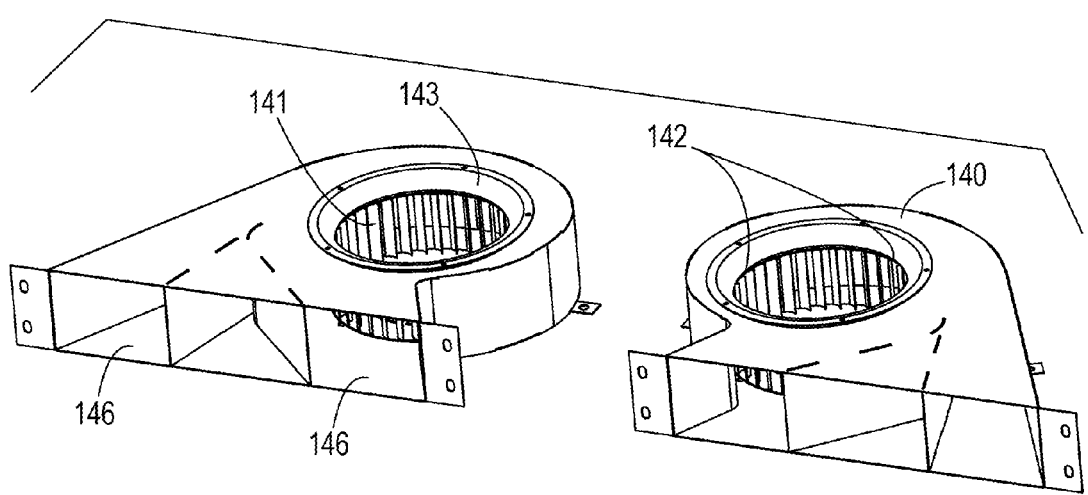
FIG. 8 shows a pair of split scroll housings, each having a centrifugal blower inside.

Wheel volumes per Revcor catalog (2.5M-7/97) testing wheels in blower housings per AMCA bulletin 210, FIG. 4 test apparatus In various embodiments, the split scroll housing 140 has a single inlet 142 and is designed to provide equal airflow between the two outlets 146. The inlet 142 is aligned with the opening 135 in the compartment in which the heat source 130 is located (FIG. 4). In some embodiments, a curved collar 143 is provided around the inlet 142 to improve fluid flow characteristics (FIGS. 4 and 8). The face of the split scroll housing 140 opposite the inlet 142 has a smaller opening through which a drive shaft to which the centrifugal blower 141 is attached.

Figure 5:
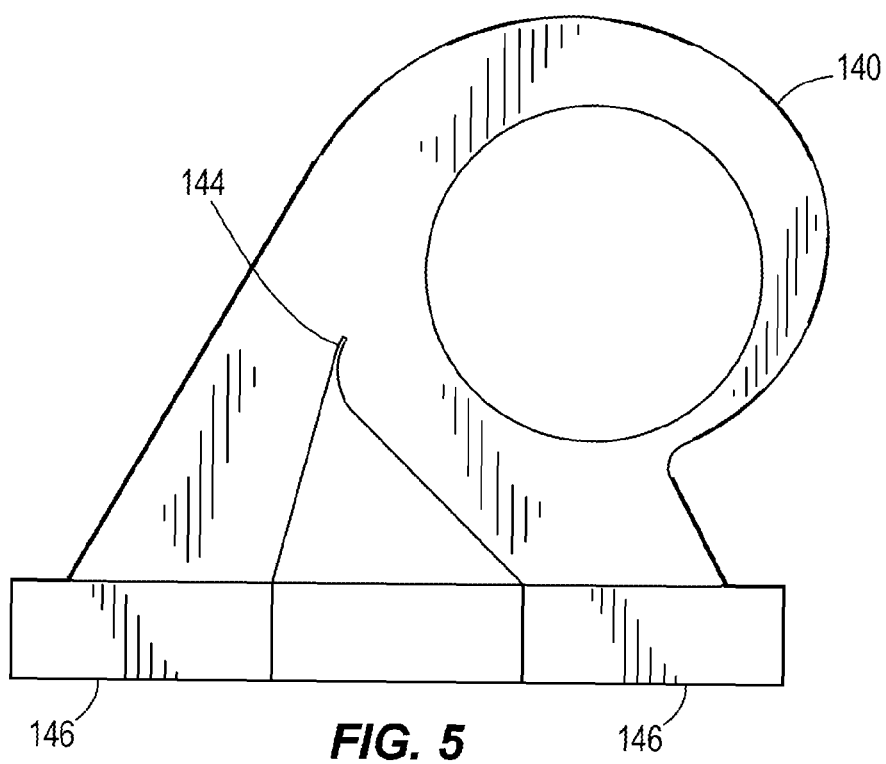
FIG. 5 shows a top view of a split scroll housing.
Figure 6:
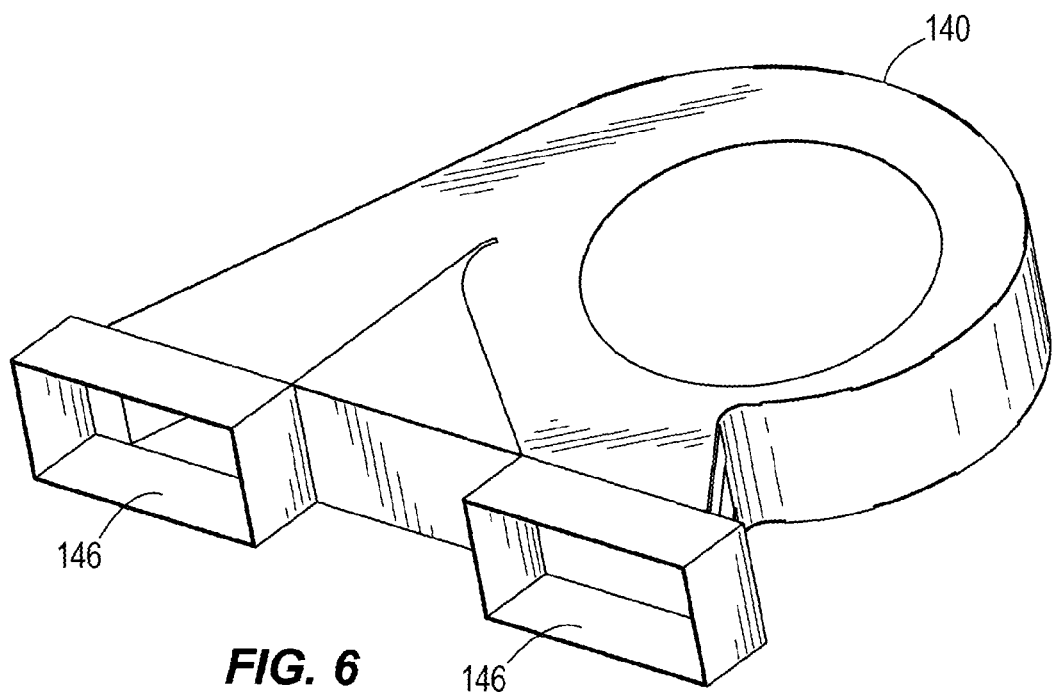
FIG. 6 shows a perspective view of a split scroll housing.

Although the air splitter 144 is shown in FIGS. 5 and 6 as having a sharp edge which faces into the airflow, other shapes such as rounded or truncated edges may instead be used, based on factors such as fluid flow dynamics. While the examples in the figures show only two outlets 146 in the housing 140, in various embodiments the housing 140 may have more than two outlets 146, such as three, four, five, or more outlets 146 to properly accommodate the number and size of the fingers 150 that are being fed by the housing 140.

While the velocity of air through the two or more outlets 146 may be dissimilar from one another, the air volumes of the outlets 146 are preferably the same within about 10% of one another when the housing 140 is built to the expected tolerance of common sheet metal fabrication. In various embodiments, the housing 140 may be made of sheet metal, die-cast metal, or other materials and fabrication methods that result in a housing that can withstand the high temperatures (e.g. 650-700° F.) present in the oven.

Further, while the examples show the outlets 146 in the same plane and aiming in approximately the same direction, in various embodiments the housing 140 may include outlets 146 that point in different directions, the openings of which may be at angles with respect to one another. These different angular outlets may be further identified through computational fluid dynamics (CFD) analysis.

In the illustrated embodiments, the air distribution housing is integrated with the housing of the blower. Nevertheless, in other embodiments the blower housing and air distribution housing may be separate components that are in airflow communication with one another.

Figure 7:
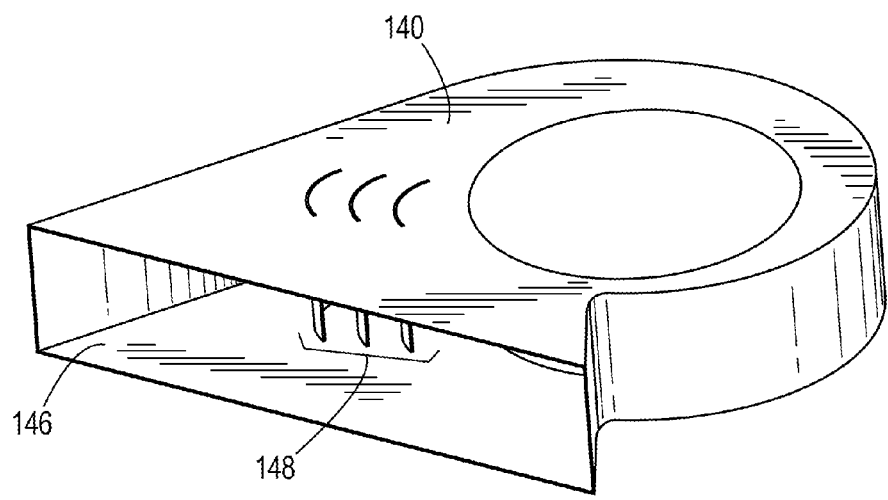
FIG. 7 shows a perspective view of a scroll housing with turning vanes disposed in the opening.

While the improved blower housing is referred to herein as a split scroll housing, one skilled in the art will appreciate that the invention encompasses various types of air flow pathways which divide a blower output into two or more pathways with improved airflow characteristics, including without limitation reduced turbulence and/or increased velocity. For example, in various embodiments, the air splitter 144 design may be replaced or supplemented by one or more turning vanes 148 to provide comparable distributions of flow from the housing 140 (FIG. 7).

Figure 9:
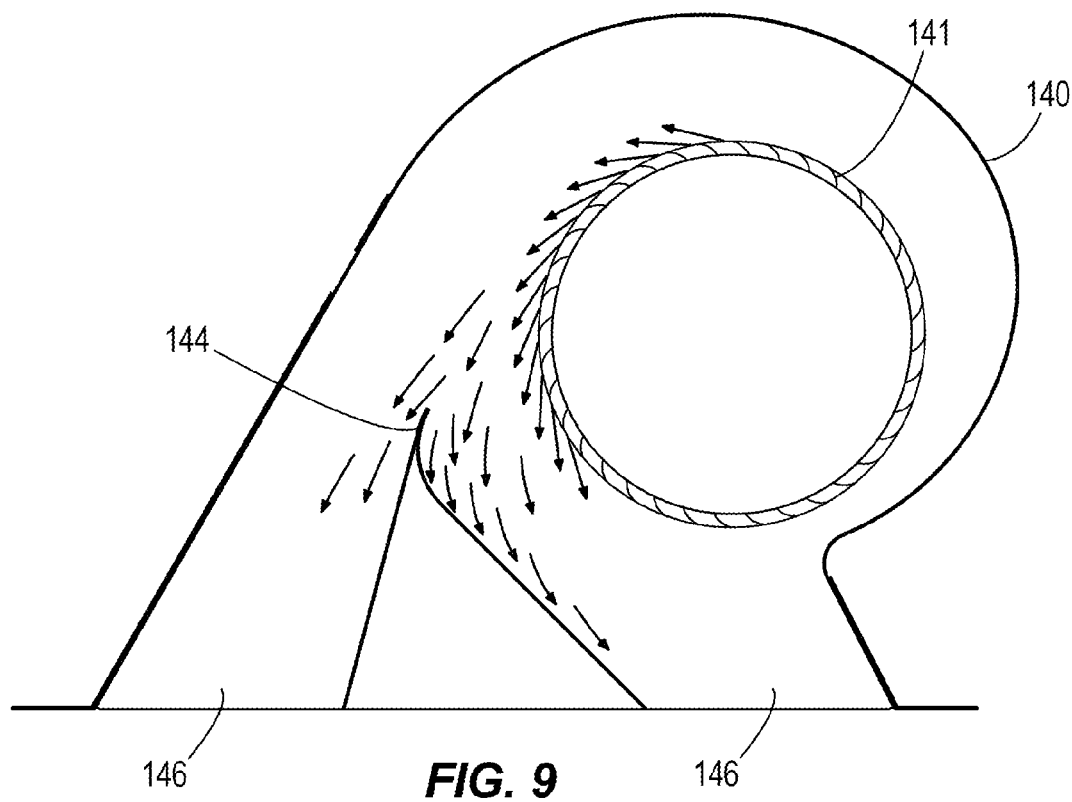
FIG. 9 shows a top view of a split scroll housing with arrows indicating air flow patterns.
Figure 10:
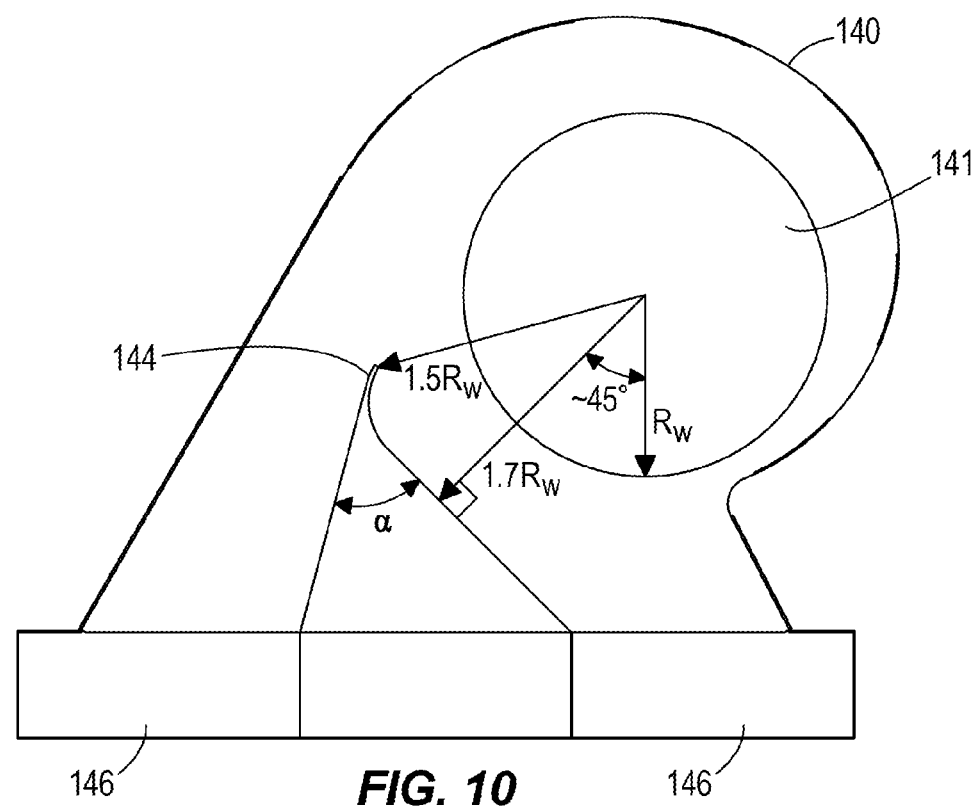
FIG. 10 shows a top view of a split scroll housing with arrows indicating relative dimensions.

FIG. 9 shows a side view of the split scroll housing 140 showing the position of the centrifugal blower 141, along with a series of arrows indicating the direction of airflow from the centrifugal blower 141. FIG. 10 shows a diagram of the side of the housing 140 with a series of arrows indicating the radius of the centrifugal blower 141 ($R_w$), the edge of the splitter 144 (1.5 $R_w$), and one face of the splitter 144 (1.7 $R_w$). In a preferred embodiment, the splitter 144 has an approximately triangular wedge shape with one side facing the centrifugal blower 141 and with the edge of the splitter 144 having an extension which curves from the side facing the centrifugal blower 141 towards the blower wheel (FIG. 10). Given a blower wheel radius of $R_w$, in a preferred embodiment the end of the splitter is a distance of approximately 1.5 $R_w$ from the center of rotation of the centrifugal blower 141. The side of the splitter that faces the centrifugal blower 141 is perpendicular to a radial line which is approximately 45° from the vertical and this line is at a distance of approximately 1.7 $R_w$ from the center of rotation of the centrifugal blower 141, as shown in FIG. 10. The included angle α between the two faces of the splitter 144 is preferably between 60° and 65° and in one preferred embodiment is approximately 62° (FIG. 10). Without being limited by theory, the curve at the edge of the splitter 144 appears to reduce turbulence by being approximately aligned with the airflow patterns emanating from the centrifugal blower 141 and evenly dividing the airflow path towards one of the outlets 146.

Thus, the invention provides, among other things, a convection-heated conveyor oven with a split scroll housing. Various features and advantages of the invention are set forth in the following claims.

What is claimed is:

1. A convection oven system, comprising:
   a cooking chamber;
   a heat source for generating heated air to be provided to the cooking chamber;
   a centrifugal blower in airflow communication with the heated air;
   an air distribution housing in airflow communication with the centrifugal blower, the air distribution housing having an air splitter formed from at least two diverging faces that each define, with the air distribution housing, a single outlet in a plurality of outlets and a single channel leading from the centrifugal blower to the single outlet, wherein all of the outlets are disposed in a common plane and the air splitter does not extend beyond the common plane; and
   at least one heat distribution finger in airflow communication with at least one of the plurality of outlets of the air distribution housing,
   wherein the heated air generated by the heat source is forced by the centrifugal blower through at least one of the outlets of the air distribution housing into the at least one finger for distribution into the cooking chamber.

2. The convection oven system of claim 1, wherein the centrifugal blower is disposed within the air distribution housing.

3. The convection oven system of claim 1, wherein the air distribution housing comprises at least one split scroll housing.

4. The convection oven system of claim 1, wherein the cooking chamber comprises a tunnel, and wherein the convection oven system further comprises a conveyor belt disposed within the tunnel.

5. The convection oven system of claim 4, wherein the at least one heat distribution finger is located within the tunnel and is disposed above or below the conveyor belt such that the heated air is forced through the at least one finger towards the conveyor belt.

6. The convection oven system of claim 1, further comprising a plurality of heat distribution fingers in airflow communication with the air distribution housing.

7. The convection oven of claim 6, wherein each of the plurality of heat distribution fingers is in airflow communication with one of the plurality of outlets of the air distribution housing.

8. A convection-heated conveyor oven system, comprising:
   a cooking chamber comprising a tunnel;
   a conveyor belt disposed within the tunnel;
   a heat source for generating heated air to be provided to the cooking chamber;
   a housing with an air splitter formed from at least two diverging sides which direct air to a plurality of outlets in the housing, wherein all of the plurality of outlets are disposed in a common plane and the air splitter does not extend beyond the common plane;
   a centrifugal blower in airflow communication with the heated air and disposed within the housing, wherein one of the diverging sides of the air splitter faces the centrifugal blower and another of the diverging sides faces away from the centrifugal blower; and
   a plurality of heat distribution fingers in airflow communication with the housing,
   wherein the heated air generated by the heat source is forced by the centrifugal blower through the plurality of outlets of the housing and into the plurality of fingers for distribution into the cooking chamber, with each of the plurality of outlets in communication with a different one of the plurality of fingers.

9. The convection oven system of claim 8, wherein the plurality of heat distribution fingers is located within the tunnel and is disposed above the conveyor belt such that the heated air is forced through the fingers towards the conveyor belt.

10. The convection oven system of claim 9, further comprising a second plurality of heat distribution fingers in airflow communication with a second housing, wherein the second plurality of heat distribution fingers is disposed below the conveyor belt to direct heated air towards the conveyor belt.

11. The convection oven system of claim 10, further comprising a second centrifugal blower disposed within the second housing, the second centrifugal blower being in airflow communication with a heat source and a second split scroll housing being in airflow communication with the second plurality of heat distribution fingers, wherein the centrifugal blower and the second centrifugal blower are independently controllable.

12. A convection oven system, comprising:
   a cooking chamber;
   a heat source for generating heated air to be provided to the cooking chamber;
   a centrifugal blower in airflow communication with the heated air;
   an air distribution housing in airflow communication with the centrifugal blower, the air distribution housing having an air splitter formed from at least two diverging sides that each defines, with the air distribution housing, a single outlet in a plurality of outlets and a single channel leading from the centrifugal blower to the single outlet, wherein at least one of the diverging sides of the air splitter faces the centrifugal blower and at least another of the diverging sides faces away from the centrifugal blower, all of the outlets are disposed in a common plane, and the air splitter does not extend beyond the common plane; and at least one heat distribution finger in airflow communication with at least one of the plurality of outlets of the air distribution housing, wherein the heated air generated by the heat source is forced by the centrifugal blower through at least one of the plurality of outlets of the air distribution housing into the at least one finger for distribution into the cooking chamber.

13. The convection oven system of claim 12, wherein the centrifugal blower is disposed within the air distribution housing.

14. A convection-heated conveyor oven system, comprising:

a cooking chamber comprising a tunnel;
a conveyor belt disposed within the tunnel;
a heat source for generating heated air to be provided to the cooking chamber;
a housing with an air splitter which directs air to a plurality of outlets in the housing, wherein all of the outlets are disposed in a common plane and the air splitter does not extend beyond the common plane;
a centrifugal blower that is in airflow communication with the heated air and has an axis of rotation, wherein the airflow splitter is formed from at least two diverging sides that meet at an edge that defines a line that is parallel to the axis of rotation of the centrifugal blower; and
at least one heat distribution finger in airflow communication with the housing,
wherein the heated air generated by the heat source is forced by the centrifugal blower through at least one of the plurality of outlets of the housing into the at least one finger for distribution into the cooking chamber.

15. The convection-heated conveyor oven system of claim 14, wherein the centrifugal blower is disposed within the air distribution housing.

16. A convection-heated conveyor oven system, comprising:

a cooking chamber comprising a tunnel;
a conveyor belt disposed within the tunnel;
a heat source for generating heated air to be provided to the cooking chamber;
a housing with an air splitter which directs air to a plurality of outlets in the housing, wherein all of the plurality of outlets are disposed in a common plane, and the air splitter does not extend beyond the common plane; and
a centrifugal blower that is in airflow communication with the heated air and has an axis of rotation,
wherein the air splitter and the housing define at least two channels each leading from the centrifugal blower to at least one of the plurality of outlets, wherein the at least two airflow channels each has a longitudinal axis that is orthogonal to the axis of rotation of the centrifugal blower; and
at least one heat distribution finger in airflow communication with the housing,
wherein the heated air generated by the heat source is forced by the centrifugal blower through at least one of the plurality of outlets of the housing into the at least one finger for distribution into the cooking chamber.

17. The convection-heated conveyor oven system of claim 16, wherein the centrifugal blower is disposed within the air distribution housing.

18. A convection-heated conveyor oven system, comprising:

a cooking chamber comprising a tunnel;
a conveyor belt disposed within the tunnel;
a heat source for generating heated air to be provided to the cooking chamber;
a housing with an air splitter which directs air to a plurality of outlets in the housing, wherein all of the outlets are disposed in a common plane and the air splitter does not extend beyond the common plane;
a centrifugal blower that is in airflow communication with the heated air and has an axis of rotation, wherein the airflow splitter is formed from at least two diverging sides that meet at an edge that defines a line that is parallel to the axis of rotation of the centrifugal blower, and wherein the air splitter and the housing define at least two channels each leading from the centrifugal blower to at least one of the plurality of outlets, wherein the at least two airflow channels each has a longitudinal axis that is orthogonal to the axis of rotation of the centrifugal blower; and
at least one heat distribution finger in airflow communication with the housing,
wherein the heated air generated by the heat source is forced by the centrifugal blower through at least one of the plurality of outlets of the housing into the at least one finger for distribution into the cooking chamber.

19. The convection-heated conveyor oven system of claim 18, wherein the centrifugal blower is disposed within the air distribution housing.

20. The convection-heated oven system of claim 18, wherein the air splitter is formed from at least two diverging sides that each defines, with the air distribution housing, a single outlet in a plurality of outlets and a single channel leading from the centrifugal blower to the single outlet, wherein at least one of the diverging sides of the air splitter faces the centrifugal blower and at least another of the diverging sides faces away from the centrifugal blower.

* * * * *